United States Patent [19]

Magder

[11] 4,426,365

[45] Jan. 17, 1984

[54] METHOD FOR REMOVING NITROGEN OXIDES FROM GAS STREAMS AND REGENERATING SPENT SORBENT

[75] Inventor: Jules Magder, Princeton, N.J.

[73] Assignee: Noxso Corporation, Reston, Va.

[21] Appl. No.: 258,187

[22] Filed: Mar. 31, 1981

Related U.S. Application Data

[60] Division of Ser. No. 144,078, Apr. 28, 1980, Pat. No. 4,323,544, which is a continuation of Ser. No. 54,337, Jul. 2, 1979, which is a continuation of Ser. No. 945,769, Sep. 25, 1978, abandoned, which is a continuation of Ser. No. 871,920, Jan. 23, 1978, abandoned, which is a continuation of Ser. No. 745,944, Nov. 29, 1976, abandoned, which is a continuation of Ser. No. 625,275, Oct. 23, 1975, abandoned, which is a continuation of Ser. No. 444,191, Feb. 15, 1974, abandoned, Division of Ser. No. 263,483, Jun. 16, 1972, abandoned.

[51] Int. Cl.$^3$ .............. B01J 8/00; C01B 21/00
[52] U.S. Cl. .................. 423/239; 423/351; 502/34; 502/355
[58] Field of Search .......... 423/239, 239 A, 351, 423/244 A; 252/463, 411 R

[56] References Cited

U.S. PATENT DOCUMENTS

| | | | |
|---|---|---|---|
| 3,382,033 | 5/1968 | Kitawaga | 423/239 |
| 3,459,494 | 8/1969 | Harris | 423/239 |
| 3,755,535 | 8/1973 | Naber | 423/244 |

FOREIGN PATENT DOCUMENTS

| | | | |
|---|---|---|---|
| 623256 | 7/1961 | Canada | 423/239 |
| 88554 | 3/1921 | Switzerland | 423/400 |

*Primary Examiner*—Gregory A. Heller
*Attorney, Agent, or Firm*—Sprung, Horn, Kramer & Woods

[57] ABSTRACT

Novel sorbents comprising (a) an alumina component comprising alumina of the surface area of at least 20 and preferably 100 square meters per gram, and (b) a salt, or mixtures of salts, of an alkali or alkaline earth metal, especially oxides, hydroxides, carbonates, nitrates, acetates or aluminates of sodium and potassium, are outstandingly effective for the removal of nitrogen oxides and sulfur oxides from waste gas streams.

13 Claims, No Drawings

METHOD FOR REMOVING NITROGEN OXIDES FROM GAS STREAMS AND REGENERATING SPENT SORBENT

This is a division of application Ser. No. 144,078 now U.S. Pat. No. 4,323,544 Apr. 6, 1982, filed Apr. 28, 1980, which in turn was a continuation of Application Ser. No. 54,337 filed July 2, 1979, which in turn was a continuation of application Ser. No. 945,769, filed Sept. 25, 1978 (now abandoned) which in turn is a continuation of Ser. No. 871,920, filed Jan. 23, 1978 (now abandoned) which in turn is a continuation of Ser. No. 745,944, filed Nov. 29, 1976 (now abandoned), which in turn is a continuation of Ser. No. 625,275, filed Oct. 23, 1975 (now abandoned), which in turn is a continuation of Ser. No. 444,191, filed Fed. 15, 1974 (now abandoned) which in turn is a division of Ser. No. 263,483, filed June 16, 1972 (now abandoned).

The present invention relates to a sorbent system and process for removing pollutants from gas streams. More specifically, the invention is directed to removing nitrogen oxides from waste gas streams. In additional aspect, the method of the invention can be utilized to remove also sulfur oxides from gas streams.

The nitrogen oxides which are pollutants are nitric oxide (NO) and nitrogen dioxide ($NO_2$ or $N_2O_4$); the relatively inert nitric oxide is often only difficultly removed, relative to $NO_2$. The lower oxide of nitrogen, $N_2O$ (nitrous oxide) is not considered a pollutant at the levels usually found in ambient air, or as usually discharged from effluent sources. Sulfur oxides considered to be pollutants are sulfur dioxide and sulfur trioxide.

Particularly obnoxious sources of nitrogen and sulfur oxide pollutants are power plant stack gases, automobile exhaust gases, heating plant stack gases, and various industrial process effluents such as smelting operations and nitric and sulfuric acid plants.

Power plant emissions represent an especially formidable source of nitrogen oxides and sulfur oxides, by virtue of the very large tonnage of these pollutants in such emissions discharged into the atmosphere annually. Moreover, because of the low concentration of the pollutants in such emissions, typically 0.05% or less for nitrogen oxides and 0.3% or less for sulfur dioxide, their removal is difficult because very large volumes of gas must be treated.

Of the few practical systems which have hitherto been proposed for the removal of nitrogen oxides from power plant flue gases, all have certain disadvantages. One such process entails scrubbing the gas with a slurry of magnesium hydroxide or carbonate; the slurry is regenerated by treatment with ammonia. However, this process produces by-product ammonium nitrate which is difficult to dispose of, and also requires cooling and reheating the gas stream.

Various methods have been proposed for the removal of sulfur dioxide from power plant flue gases, but all of these have disadvantages. For example, wet scrubbing systems based on aqueous alkaline materials such as solutions of sodium carbonate or sodium sulfite, or slurries of magnesia, lime, or limestone, usually necessitate cooling the flue gas to about 55° C. in order to establish a water phase. At these temperatures the treated gas usually requires reheating in order to develop enough buoyancy to obtain an adequate plume rise from the stack. Moreover, such processes also create products involving a solid waste disposal problem.

Various solid phase processes for the removal of sulfur dioxide which have hitherto been proposed also have disadvantages. The use of limestone or dolomite, for example, to absorb sulfur dioxide creates a waste disposal problem if the solid is not regenerated.

Systems involving the regeneration of solid sorbents, for example, sodium aluminate (also known as "alkalized alumina") characteristically require hydrogen or mixtures of hydrogen and carbon monoxide to accomplish the regeneration. Such regeneration gases are often not conveniently available at the desired location, or else must be produced by relatively costly processes. Also, the sorbent is usually regenerated at relatively high temperatures, typically above 650° C. These hight temperatures result in physical attrition and hence reduced lifetime of the sorbent, and also expend fuel in heating the sorbent from the sorption to the regeneration temperature.

The present invention provides a method of removing nitrogen oxides, and optionally, sulfur oxides, from waste gas streams simultaneously, in a single process. Moreover, in the present invention it is possible to treat the waste gas stream at a temperature at which it still has adequate buoyancy to obtain good plume rise from the stack. The sorbent of this invention removes $NO_2$, as well as the relatively inert NO, in an efficient manner.

The process of this invention also provides for the removal of nitrogen oxides and sulfur oxides from waste gases (which process produces elemental nitrogen and elemental sulfur or a non-polluting gaseous compound of nitrogen) without producing solid waste products which would create a disposal problem. The process of the present invention utilizes only relatively small quantities of natural gas or other hydrocarbon fuel.

Essentially, the process of the present invention comprises contacting a waste gas stream containing oxides of nitrogen and, optionally, sulfur with a sorbent comprising alumina and an "alkaline component" to sorb at least part of the nitrogen and sulfur oxides. The nitrogen- and sulfur-laden sorbent is then regenerated by heating the sorbent in a hydrogen-sulfide containing gas stream at temperatures up to about 750° C., whereby nitrogen is removed as elemental nitrogen or a non-polluting nitrogen compound such as nitrous oxide and sulfur is removed as elemental sulfur. The sulfur produced on regeneration may be partially used to produce hydrogen sulfide, preferably by catalytic reaction of the sulfur with hydrocarbon and water vapor at elevated temperatures, while the remainder of the sulfur is recovered. The regenerated sorbent is then used for further removal of oxides of sulfur and nitrogen.

The sorbent which has been discovered, according to the present invention, to be active for the simultaneous removal of nitrogen and sulfur oxide pollutants comprises a combination of alumina in the form of "activated alumina" and, as the "alkaline component", an alkaline form of an alkali or alkaline earth element.

"Activated alumina" in the present invention means a form of alumina with an extended surface area, usually above about 100 square meters per gram, and often as high as 400 or 500 square meters per gram. Many methods are known in the art whereby such forms of alumina may be prepared. For example, high surface area alumina may be precipitated from a sodium aluminate solution or sol by the addition of an acidic material such as carbon dioxide, mineral acid, or an acidic salt such as aluminum sulfate. Other methods of producing high surface area aluminas involve the dehydration of aluminum hydroxides such as aluminum hydrate (Al(OH)$_3$) or bauxite. Activated bauxite is a particularly useful source of alumina for the present invention because of its low cost. A further useful source of high-surface-area alumina for purposes of the present invention are the by-products from the hydrolysis of aluminum alkoxides such as aluminum triisopropoxide. Such aluminas which are characterized by extremely high purity in terms of the absence of other metallic elements, have recently become commercially available at relatively low cost.

The extended surface area requirement for the alumina component used in this invention is critical with respect to SO$_x$ removal and preferred with respect to NO$_x$ removal inasmuch as lower surface-area alumina, e.g. so-called "alkalized alumina" of, e.g., a surface area of 40 m$^2$/gm, does not result in the high efficiency of SO$_x$ removal over time that is achieved by the present invention. In fact, efforts for commercial use, for SO$_x$ removal, of alkalized alumina have been substantially abandoned because such materials did not stand up over extended, practical periods of usage However, for NO$_x$ removal, surface areas of 20 m$^2$/gm are operative, although an area of at least 100 m$^2$/gm is greatly preferred.

The alkaline component of the sorbent of the present invention may be advantageously incorporated as the hydroxide, carbonate, nitrate, acetate, or other soluble salt of a Group IA metal, or of a IIA metal of an atomic number greater than 4, with the atomic number of the metals not exceeding 56; more particularly, of a metal selected from the group consisting of lithium, sodium, potassium, rubidium, cesium, magnesium, calcium, strontium, and barium; or mixtures thereof. The ratio of alkali or alkaline earth metal atoms (in the alkaline component) to aluminum atoms (in the activated alumina) in the sorbent of the present invention may be in the range from 5:95 to 60:40, although a preferred range is 10:90 to 40:60. The preferred metals in the alkaline component are sodium, potassium, and calcium, and sodium and potassium are most preferred, because of their excellent performance. It will be understood that mixed salts may be used as component (b); i.e., a mixture of salts (1) having the same metal but different anion portions, or (2) having the same anion but different metal portions, or (3) having different metal and anion portions, may be used. For instance, a mixture of sodium acetate and carbon, or a mixture of potassium and sodium carbonates, or a mixture of potassium acetate and sodium carbonate may be advantageously employed as component (b).

The exact chemical or crystallographic form of the sorbent is not narrowly critical in the present invention, provided that the surface area of sorbent when prepared or after regeneration is at least about 100 square meters per gram. In fact, the sorbent probably changes in structure after regeneration as compared to its fresh condition. The alkaline component may be present as the oxide, hydroxide, carbonate, or aluminate, or mixtures of these compounds, when the sorbent is freshly prepared or after it has been regenerated. Various amounts of sulfur or nitrogen-containing salts may also be present, such as nitrates, nitrite, sulfate, sulfite, or sulfide.

The sorbent may be prepared by impregnating the high-surface-area activated alumina with a solution of the alkaline component; or by precipitation of the alumina in the presence of a soluble salt alkaline component, followed by heating; or by co-precipitation of alumina and the alkaline component from solution, followed by drying, according to methods which are well known in the art.

Various other metallic oxides, such as copper, iron, vanadium, zinc, molybdenum, or rare earth elements, may also be present in amounts up to about 10 atom percent, based on the total atoms of aluminum, alkaline component, and other metal(s).

The waste gas stream containing nitrogen and sulfur oxides is contacted with the sorbent at temperatures of 85° C. to about 200° C., and preferably about 90° to 150° C. At higher temperatures the efficiency of nitrogen oxide removal is decreased, while at lower temperatures the waste gas stream would require reheating or recompression to develop adequate stack plume.

The sorbent and waste gas may be contacted in a fixed bed, fluid bed, or moving bed, according to methods which are known in the art. The residence time necessary is in the range of 0.1 to about 10 seconds if the contacting is conducted in a fixed bed, but a wider range is possible in fluid bed operation.

After the sorbent has become laden with nitrogen and, optionally, sulfur, preferably to a level corresponding to a greater than about one equivalent of nitrogen plus sulfur for each five equivalents of alkaline component, it is regenerated. For this purpose one equivalent of sulfur is taken as one-half of a gram-atom, one equivalent of nitrogen is one gram-atom, one equivalent of alkali metal is one gram-atom, and one equivalent of alkaline earth metal is one-half of a gram-atom. The sorbent is regenerated by contacting with a regenerant gas stream containing at least 0.01 atmosphere partial pressure of hydrogen sulfide, at temperatures of about 350° to about 700° C., for a period of time sufficient to recover a substantial portion of the sorbent's capacity for nitrogen oxide and sulfur oxide sorption. The minimum time required for regeneration depends strongly on the temperature and partial pressure of hydrogen sulfide in the regenerant gas, and may vary from a few minutes at 750° C. to 12 hours or more at lower temperatures.

The regenerant gas preferably contains carbon dioxide or water vapor, and, more preferably, contains both carbon dioxide and water vapor. Alternatively, the sorbent is treated with carbon dioxide and/or water vapor after contacting with the hydrogen-sulfide containing regenerant gas. When carbon dioxide and/or water vapor are used, they are preferably employed in total amount corresponding to at least about one mole of carbon dioxide and/or water vapor per mole of oxide gas sorbed before regeneration.

A convenient means of obtaining a suitable regenerant gas containing carbon dioxide is by the catalytic vapor phase reaction of steam, sulfur, and a hydrocarbon such as methane, essentially according to the reaction $$CH_4 + 2H_2O + 4S \rightarrow 4H_2S + CO_2.$$

For purposes of this invention, the use of hydrogen sulfide in the regenerant gas should be taken to include the use of other compounds which will essentially form hydrogen sulfide under the conditions of regeneration, viz. carbon disulfide or carbon oxysulfide in the presence of steam:

$$CS_2 + 2H_2O \rightleftharpoons CO_2 + 2H_2S,$$

or $$COS + H_2O \rightleftarrows CO_2 + H_2S.$$

During regeneration, sulfur forms in the regenerant stream and is condensed by cooling downstream from the sorbent. During this process at least part of the hydrogen sulfide is converted to elemental sulfur. Any unconverted hydrogen sulfide can be readily recycled after the sulfur has been condensed.

After the sorbent has been regenerated, it is cooled to the sorption temperature, for example, by contacting with a cooler waste gas stream. The sorbent is then re-used for removing sulfur and nitrogen oxides.

EXAMPLE 1

600 grams of a commercial activated alumina having $-10+20$ U.S. standard mesh size and surface area of about 200 square meters per gram was impregnated with a solution containing 61.7 grams of sodium carbonate and 360 grams of water. The mixture was dried in a rotary vacuum evaporator at 25° to 90° C., then heated 2 hours in air in an oven at 120° C.

22.5 grams of the sorbent was loaded into a 2 ft. by 1 inch diameter Vycor glass reactor heated by a temperature-controlled tube furnace. The temperature was adjusted to 100° C., and a simulated power plant effluent gas was introduced having the following approximate volume composition: 80.1% $N_2$, 11.4% $CO_2$, 4.68% $H_2O$, 3.65% $O_2$, 0.16% $SO_2$, 0.036% NO, 0.004% $NO_2$. The flow rate was 55.0 liters per hour, measured at 25° C. and 1 atmosphere pressure.

Samples of the reactor effluent were periodically taken and analyzed for nitrogen oxides ($NO + NO_2$, expressed as $NO_x$), and for sulfur dioxide with the following results:

| Time on Stream, hours | % $NO_x$ Removal |
|---|---|
| 0.5 | 85.0 |
| 1.0 | 86.5 |
| 1.7 | 86.3 |
| 2.0 | 90.8 |
| 2.6 | 94.5 |
| 3.0 | 91.9 |
| 3.5 | 94.7 |
| 4.5 | 93.5 |
| 5.5 | 94.5 |
| 6.5 | 90.0 |
| 7.3 | 93.6 |
| 7.8 | 94.7 |
| 8.8 | 97.0 |
| 10.0 | 96.2 |

| Time on Stream, hours | % $SO_2$ Removal |
|---|---|
| 2.4 | 97.0 |
| 5.2 | 89.0 |
| 10.0 | 42.0 |

Percent $NO_x$ removal is taken as $$100 \left(1 - \frac{NO_x \text{ effluent concentration}}{NO_x \text{ influent concentration}}\right) \%;$$

similarly for percent $SO_2$ removal.

After 26.0 hours on stream $NO_x$ removal was 50.1%.
After 16.7 hours on stream, $SO_2$ removal was 18.0%.

The sorbent was then regenerated by heating the reactor to 500° C. in $N_2$, then introducing a stream containing 9% $H_2S$ and 91% $N_2$ at about 20 liters/hour for 6 hours. Sulfur was condensed downstream from the sorbent bed. The sorbent was then cooled in nitrogen to 100° C.

EXAMPLE 2

A second sorption run was conducted on the generated sorbent from Example 1, using the same conditions and feed stream composition. The results were as follows:

| Time on Stream, hours | % $NO_x$ Removal |
|---|---|
| 1.0 | 100.0 |
| 2.0 | 100.0 |
| 3.0 | 100.0 |
| 4.0 | 89.3 |
| 5.0 | 94.9 |
| 6.0 | 94.0 |
| 8.0 | 91.0 |
| 9.3 | 91.8 |
| 10.0 | 84.4 |
| 11.0 | 79.5 |
| 12.0 | 63.3 |
| 13.0 | 58.5 |

| Time on Stream, hours | % $SO_2$ Removal |
|---|---|
| 0.5 | 100.0 |
| 1.5 | 84.4 |
| 3.3 | 21.6 |
| 4.5 | 18.2 |

Thus, it is evident that the sorbent is highly efficient for $NO_x$ removal for periods in excess of 10 hours, and efficient for $SO_2$ removal for several hours. Also, the sorbent was effectively regenerated by treatment with hydrogen sulfide.

EXAMPLE 3

The spent sorbent of Example 2 was regenerated by heating at 500° C. in 9% $H_2S$–91% $N_2$ for 6 hours at 20 liters/hour or regenerant gas. The sorbent was then cooled to 100° C. in a stream containing 95% $N_2$ and 5% $H_2O$. In a third sorption cycle similar to that of Example 1, the results were:

| Time on Stream, hours | % $NO_x$ Removal |
|---|---|
| 1.5 | 100.0 |
| 4.5 | 100.0 |
| 5.5 | 99.9 |
| 6.5 | 92.9 |
| 7.8 | 90.4 |

| Time on Stream, hours | % $SO_2$ Removal |
|---|---|
| 1.8 | 100.0 |
| 5.3 | 41.2 |
| 7.0 | 15.7 |

Thus, it is evident that the use of steam in conjunction with the regeneration effected the recovery of more of the sorbent's efficiency for $SO_2$ emoval, than in Example 2 in which the regeneration was conducted without steam.

EXAMPLE 4

Sorbents were prepared by depositing carbonate, nitrate, or acetate salts of each of the following metals, on activated alumina: Ca, K, Sr, Ba, Mg. In each case the amount of alkaline component deposited corresponding to about 1 milligram-mole of the metal oxide ($CaO$, $K_2O$, $SrO$, $BaO$, $MgO$, respectively) per gram of sorbent. The sorbents exhibit good efficiency for $NO_x$ and $SO_2$ removal, and are regenerable.

It will be understood that the specification and examples are illustrative but not limitative of the present invention and that other embodiments within the spirit and scope of the invention will suggest themselves to those skilled in the art.

What is claimed is:

1. A method for the removal of nitrogen oxides from a gas containing them which method comprises contacting said gas at a temperature of 85° C. to about 200° C. with a sorbent, which sorbent comprises (a) an alumina component comprising alumina having a surface area of at least about 20 square meters per gram, and (b) an alkaline component comprising at least one salt of a Group IA the alkali metals or IIA the alkaline earth metals of atomic number not exceeding 56 and thereafter removing nitrogen oxides from said sorbent by a process which comprises: (c) contacting said nitrogen oxide containing sorbent in a regeneration zone where the regenerant gas stream containing at least 0.01 atmosphere partial pressure of hydrogen sulfide at a temperature of about 350 to about 750° C. for a period of time sufficient to recover a substantial portion of the sorbent's capacity for nitrogen oxide sorption; and (d) withdrawing nitrogen oxide formerly contained on said sorbent in a form of elemental nitrogen.

2. Method as claimed in claim 1, wherein the said surface area of component (a) is at least 100 $m^2/gm$.

3. Method as claimed in claim 1, wherein said contacting is effected with the sorbent in a fixed bed and wherein the contacting time is from about 0.1 to about 10 seconds.

4. Method as claimed in claim 1, wherein said contacting is effected with the sorbent in a fluid bed.

5. Method as claimed in claim 1, wherein the weight ratio of alkali or alkaline earth metal atoms in said component (a) to the alumina atoms in said component (b) is from 5:95 to 60:40.

6. Method as claimed in claim 5, wherein said ratio is from 10:90 to 40:60.

7. Method as claimed in claim 1, wherein said alumina of said component (a) has a surface area of at least 200 square meters per gram.

8. Method as claimed in claim 7, wherein said surface area is from about 400 to about 500 square meters per gram.

9. Method as claimed in claim 1, wherein said salt, of component (b), is an oxide, hydroxide, carbonate, nitrate, acetate, or aluminate, or mixtures thereof, of said Group IA or IIA metal.

10. Method as claimed in claim 1, wherein the salt of component (b) is incorporated into said sorbent, as a carbonate, nitrate or acetate, or mixtures thereof.

11. Method as claimed in claim 1, wherein said Group IA or IIA metals are selected from the group consisting of lithium, sodium, potassium, rubidium, cesium, magnesium, calcium, strontium, and barium, or mixtures thereof.

12. Method as claimed in claim 1, wherein said Group IA metal is sodium or potassium.

13. Method as claimed in claim 1, in which the sorbent is in the form of a co-precipitate of components (a) and (b).

* * * * *